(12) United States Patent
Fuller

(10) Patent No.: US 7,293,946 B1
(45) Date of Patent: Nov. 13, 2007

(54) DUNNAGE BAR LATCH RELEASE

(75) Inventor: William G. Fuller, Milford, MI (US)

(73) Assignee: MLW81, LLC, Metamora, MI (US)

( * ) Notice: Subject to any disclaimer, the term of this patent is extended or adjusted under 35 U.S.C. 154(b) by 210 days.

(21) Appl. No.: 11/293,492

(22) Filed: Dec. 2, 2005

(51) Int. Cl.
*B60P 7/08* (2006.01)

(52) U.S. Cl. .......................... 410/43; 410/32; 410/143

(58) Field of Classification Search ................. 410/32, 410/34, 35, 43, 121, 143; 211/162, 41.1, 211/72, 169, 169.1; 206/451, 454, 449; 248/225.11
See application file for complete search history.

(56) References Cited

U.S. PATENT DOCUMENTS

| | | | |
|---|---|---|---|
| 5,378,093 A | | 1/1995 | Schroeder |
| 5,582,495 A | | 12/1996 | Schroeder |
| 5,876,165 A | * | 3/1999 | Campbell ................ 410/43 |
| 6,786,687 B1 | | 9/2004 | Schroeder |

* cited by examiner

*Primary Examiner*—Stephen Gordon
(74) *Attorney, Agent, or Firm*—Reising, Ethington, Barnes, Kisselle, P.C.

(57) ABSTRACT

A bar and lock arrangement includes a bar having spaced ends, a pair of swing arms respectively extending from each end of the bar for pivotally mounting the bar on a frame, a latch at each end of the bar for releasably latching each end of the bar to the frame on which said swing arms are mounted, a cable extending between the latches for releasing the latches so that said bar can pivot around the swing arms with respect to the frame, and a handle mounted on the bar and coupled to the cable for simultaneously releasing the latches. An abutment preferably is disposed on the bar and positioned adjacent to the handle such that initial force on the handle moves the handle on said bar, releases the latches and brings the handle into engagement with the abutment, further force on the handle operating through the abutment and the bar to pivot the bar around the swing arms.

12 Claims, 2 Drawing Sheets

DUNNAGE BAR LATCH RELEASE

The present disclosure relates to a dunnage shipping assembly that includes a dunnage bar pivotally mounted on a shipping frame, and more particularly to a handle for releasing latches that couple the dunnage bar to the frame.

BACKGROUND AND OBJECTS OF THE DISCLOSURE

U.S. Pat. Nos. 5,378,093, 5,582,495 and 6,786,687, assigned to the assignee of the present application, disclose dunnage frame and bar assemblies in which a dunnage bar subassembly is pivotally mounted on a shipping frame for movement between an open position in which the dunnage may be added to or withdrawn from the frame, and a closed position in which the bar locks the dunnage in position on the frame. The dunnage bar assembly includes a dunnage bar, a latch at each end of the bar for releasably coupling each end of the bar to the frame in at least the closed position, and a pair of swing arms extending radially from respective ends of the bar and pivotally connected to the frame. A cable extends along the bar between the latches so that an operator can simultaneously release the latches to enable the swing arm to be pivoted toward the open position. A general objective of the present disclosure is to provide a handle engaged with the cable to facilitate release of the latches.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

The disclosures of above-noted U.S. Pat. Nos. 5,378,093, 5,582,495 and 6,786,687 are incorporated herein by reference.

Figure 1:
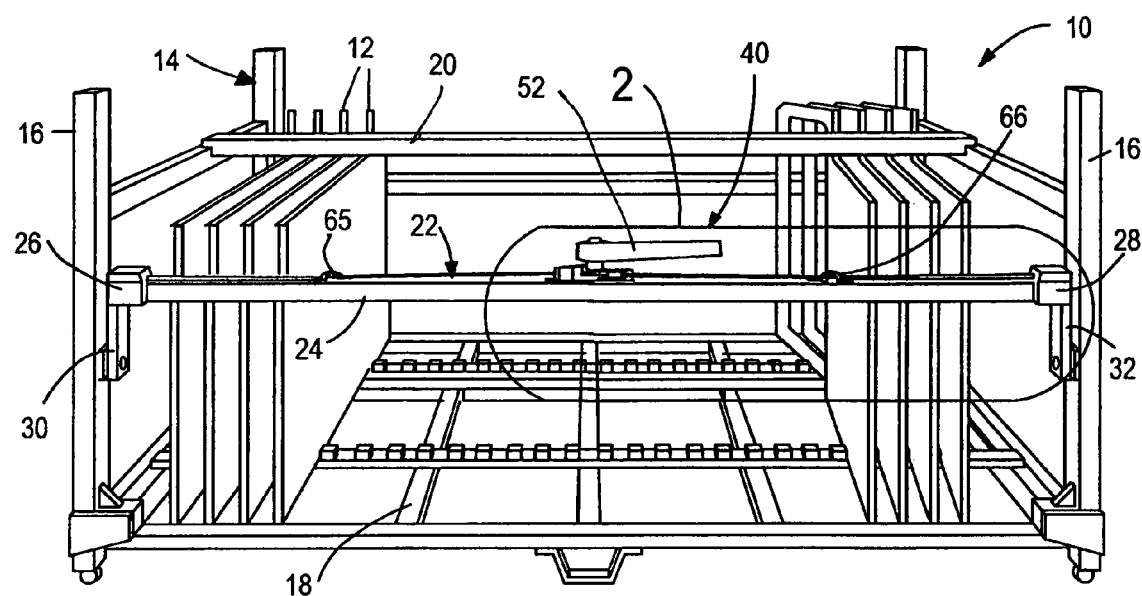
FIG. 1 is a front perspective view of a shipping frame for automotive door panels and having a pivotal dunnage bar assembly in accordance with an exemplary embodiment of the disclosure.
Figure 3:
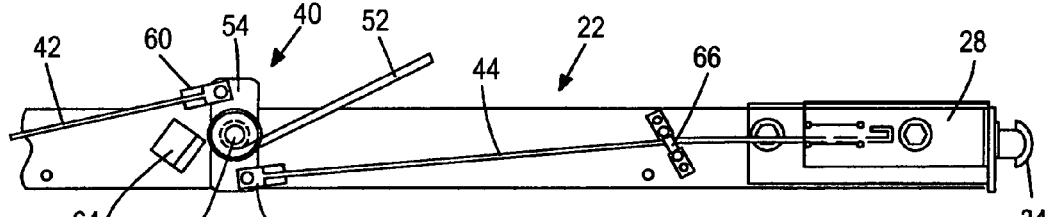
FIG. 3 is a fragmentary top plan view of the portion of the dunnage bar subassembly illustrated in FIG. 2.
Figure 2:
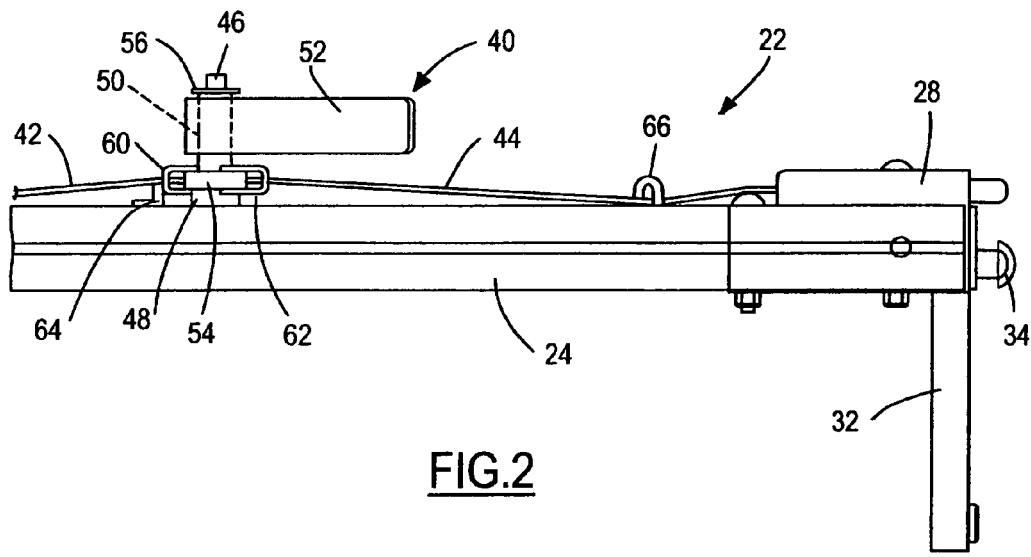
FIG. 2 is a fragmentary elevational view of the portion of the dunnage bar subassembly within the area 2 in FIG. 1.

FIG. 1 illustrates a dunnage frame and bar assembly 10 for shipping automotive door panels 12 in an exemplary embodiment of the present disclosure. Assembly 10 includes a generally rectangular frame 14 having corner members or posts 16, a bed 18, and one or more dunnage bars 20,22. At least one dunnage bar 22 is moveable from a closed position illustrated in FIG. 1 locking panels 12 in place on bed 18, and an open position for permitting addition or removal of panels 12. Dunnage bar 22 preferably is in the form of a subassembly, which preferably includes an elongated tubular bar 24, a pair of latches 26,28 at opposed ends of bar 24 for releasable latching to spaced posts 16, and a pair of swing arms 30,32 extending radially from the opposed ends of bar 24. Each swing arm 30,32 is pivotally mounted to an adjacent post 16. Such pivotal mounting may be by way of shoulder bolts as illustrated for example in U.S. Pat. Nos. 5,378,093 and 5,582,495, by means of a bushing assembly as disclosed in U.S. Pat. No. 6,786,687, or by any other suitable pivot means. The embodiment illustrated in the drawings includes pins 34 to facilitate alignment between the dunnage bar subassembly and the frame, as illustrated for example in U.S. Pat. Nos. 5,378,093 and 5,582,495, although such locator pins are strictly optional. Bar 24 can be straight or contoured as desired.

A handle 40 (FIGS. 1-5) is mounted on bar 24 and coupled to by a cable to latches 26,28 for releasing the latches. The cable preferably is in the form of separate cable segments 42, 44. Handle 40 includes a pivot pin 46 secured to bar 24, such as by a fixed base 48, and preferably approximately centrally disposed between opposed latches 26,28. A collar 50 pivotally surrounds pivot pin 46 and is free to pivot or rotate around the axis of the pivot pin. A paddle 52 is secured to and extends tangentially from the outer surface of collar 50. Paddle 52 preferably is generally flat in a plane tangential to the axis of rotation of collar 50 around pivot pin 46. Paddle 52 preferably is elongated in the direction of its plane. A bracket 54 is secured to the end of collar 50 adjacent to bar 24. Bracket 54 has opposed ends that extend radially outwardly with respect to the central axis of collar 50. The subassembly, preferably a weldment of collar 50, paddle 52 and bracket 54, is slidably received over pivot pin 46, and preferably is removably secured thereto by means of a washer 56 and a pin 58. Cable segments 42, 44 are pivotally secured to opposed ends of bracket 52 by respective links 60, 62. An abutment 64 is located on bar 24 adjacent to pivot pin 46 for engagement by bracket 54 following limited rotation of handle 40, as will be described. Cable segments 42, 44 preferably pass through respective eyelets 65, 66 between handle 40 and latches 26,28 to hold the cable segments in place.

Figure 4:
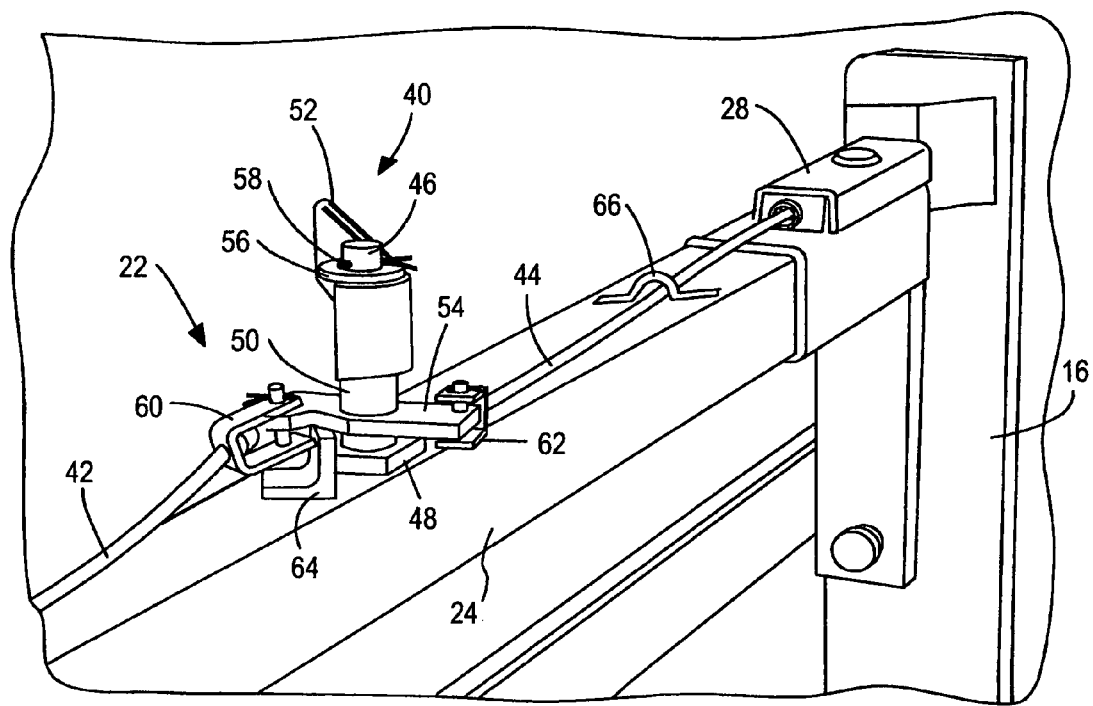
FIG. 4 is a fragmentary perspective view of the portion of the dunnage bar subassembly illustrated in FIGS. 2 and 3 coupled to the frame.
Figure 5:
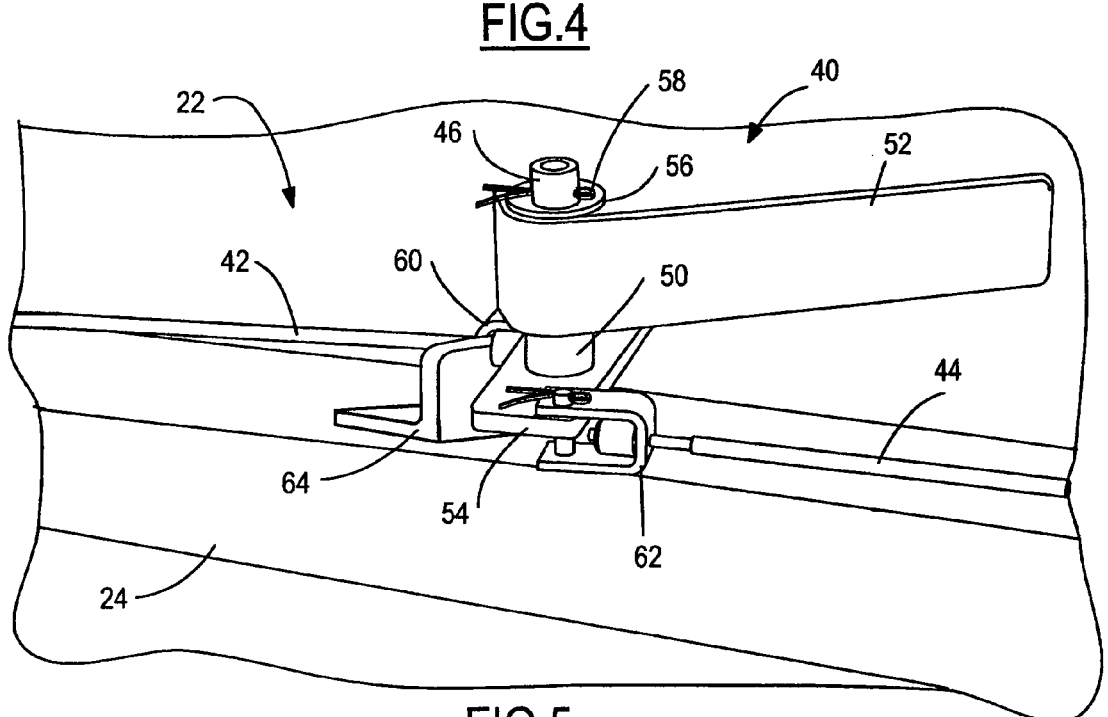
FIG. 5 is a fragmentary perspective view of the handle portion of the dunnage bar subassembly in FIGS. 1-4.

Swing arm subassembly 22 is illustrated in the closed and latched position in FIGS. 1 and 4-5. To release the swing arm subassembly, paddle 52 of handle 40 is engaged and rotated clockwise in the orientation of FIGS. 3-4 and out of the page in the orientation of FIGS. 1, 2 and 5. Such rotation of paddle 52 pulls cable segments 42, 44 toward the center of bar 24 and releases latches 26, 28 so that the dunnage bar subassembly can be pivoted from the closed position toward the open position. After paddle 52 has been pivoted sufficiently to release the latches, bracket 48 coupled to paddle 52 engages abutment 64 on bar 24. In this way, further rotation of paddle 52 is restrained, so that further force on the paddle moves bar 24 away from the closed position. The generally flat geometry of paddle 52 preferably is such that the paddle can be engaged by a robot arm moving in the downward direction in the orientation of FIG. 3, and out of the page in the orientation of FIGS. 1, 2 and 5, initially to release the latches and then to push swing arm subassembly 22 from the closed position toward the open position. The robot arm can then grasp and remove panels 12 from frame 10.

There thus has been disclosed a shipping assembly and a dunnage bar subassembly that fully satisfy all of the objects and aims previously set forth. The disclosure has been presented in conjunction with an exemplary but presently preferred embodiment, and a number of modifications and variations have been discussed. Other modifications and variations readily will suggest themselves to persons of ordinary skill in the art in view of the foregoing description.

The disclosure is intended to embrace all such modifications and variations as fall within the spirit and broad scope of the appended claims.

The invention claimed is:

1. A bar and lock arrangement that includes:
   a bar having spaced ends,
   a pair of swing arms respectively extending from each end of said bar for pivotally mounting said bar on a frame,
   a latch at each end of said bar for releasably latching each end of said bar to the frame on which said swing arms are mounted,
   a cable extending between said latches for releasing said latches so that said bar can pivot around said swing arms with respect to the frame, and
   a handle mounted on said bar and coupled to said cable for simultaneously releasing said latches.

2. The arrangement set forth in claim 1 including an abutment on said bar and positioned adjacent to said handle such that initial force on said handle moves said handle on said bar, releases said latches and brings said handle into engagement with said abutment, further force on said handle operating through said abutment and said bar to pivot said bar around said swing arms.

3. The arrangement set forth in claim 2 wherein said handle includes a pivot pin extending from said bar, a collar pivotally mounted on said pivot pin, a flat paddle extending tangentially from said collar, and a bracket extending from said collar adjacent to said bar for engagement with said abutment.

4. The arrangement set forth in claim 3 including spaced links pivotally coupling said cable to said bracket.

5. A bar and lock arrangement that includes:
   a bar having spaced ends,
   a pair of swing arms respectively extending from said ends of said bar for pivotally mounting said bar on a frame,
   a latch at each end of said bar for releasably latching each end of said bar to the frame,
   a cable extending between said latches for releasing said latches so that said bar can pivot around said swing arms with respect to said frame, and
   a handle pivotally mounted on said bar and coupled to said cable for simultaneously releasing said latches,
   said handle including a flat paddle for engagement by a robot arm to release said latches.

6. The arrangement set forth in claim 5 wherein said handle includes a pivot pin extending from said bar and a collar pivotally mounted on said pivot pin, said paddle extending tangentially from said collar.

7. The arrangement set forth in claim 6 including an abutment on said bar adjacent to said handle and a bracket extending from said collar adjacent to said bar for engagement with said abutment such that initial force on said paddle pivots said paddle around said pivot pin to release said latches and bring said bracket into engagement with said abutment, further force on said paddle pivoting said bar around said swing arms with respect to the frame.

8. The arrangement set forth in claim 7 including spaced links pivotally connecting said cable to said bracket.

9. A shipping assembly that includes:
   a frame for carrying dunnage and having spaced frame members,
   a dunnage bar having spaced ends,
   a pair of swing arms respectively extending from said ends and pivotally mounting said bar to said frame members,
   a latch at each end of said bar for releasably latching each end of said bar to said frame members,
   a cable extending between said latches for releasing said latches so that said bar can pivot around said swing arms with respect to said frame members, and
   a handle mounted on said bar and coupled to said cable for simultaneously releasing said latches.

10. The shipping assembly set forth in claim 9 including an abutment on said bar and positioned adjacent to said handle such that initial force on said handle moves said handle on said bar, releases said latches and brings said handle into engagement with said abutment, further force on said handle operating through said abutment and said bar to pivot said bar around said swing arms.

11. The shipping assembly set forth in claim 10 wherein said handle includes a pivot pin extending from said bar, a collar pivotally mounted on said pivot pin, a flat paddle extending tangentially from said collar, and a bracket extending from said collar adjacent to said bar for engagement with said abutment.

12. The shipping assembly set forth in claim 11 including spaced links pivotally coupling said cable to said bracket.

* * * * *